United States Patent
Sohn et al.

(10) Patent No.: US 9,215,571 B2
(45) Date of Patent: Dec. 15, 2015

(54) METHOD FOR TRANSMITTING AND RECEIVING PACKET FOR MULTI USER IN WIRELESS LOCAL AREA NETWORK AND APPARATUS FOR THE SAME

(75) Inventors: Ill Soo Sohn, Anyang-si (KR); Byeong Woo Kang, Anyang-si (KR); Dae Won Lee, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 156 days.

(21) Appl. No.: 14/001,128

(22) PCT Filed: Feb. 21, 2012

(86) PCT No.: PCT/KR2012/001308
§ 371 (c)(1),
(2), (4) Date: Aug. 22, 2013

(87) PCT Pub. No.: WO2012/115432
PCT Pub. Date: Aug. 30, 2012

(65) Prior Publication Data
US 2013/0329626 A1  Dec. 12, 2013

Related U.S. Application Data

(60) Provisional application No. 61/447,086, filed on Feb. 27, 2011, provisional application No. 61/449,091, filed on Mar. 4, 2011, provisional application No. 61/449,701, filed on Mar. 6, 2011.

(51) Int. Cl.
*H04H 20/71* (2008.01)
*H04W 4/08* (2009.01)
(Continued)

(52) U.S. Cl.
CPC ............... *H04W 4/08* (2013.01); *H04B 7/0452* (2013.01); *H04B 7/024* (2013.01); *H04W 84/12* (2013.01)

(58) Field of Classification Search
CPC .............................. H04W 4/08; H04B 7/0452
USPC .......................... 370/312, 389, 390, 328, 329
See application file for complete search history.

(56) References Cited

U.S. PATENT DOCUMENTS 8,879,490 B2 * 11/2014 Lee ....................... H04L 1/0009
370/329
2010/0081454 A1    4/2010  Wang et al.
(Continued)

OTHER PUBLICATIONS

U.S. Appl. No. 61/433,066, filed Jan. 14, 2011.*
(Continued)

*Primary Examiner* — Chuong T Ho
(74) *Attorney, Agent, or Firm* — Lee, Hong, Degerman, Kang & Waimey (57) ABSTRACT

A method of receiving a multi-user packet by a receiver in a wireless local area network system. The method includes: receiving a first group identifier (ID) management request message from a transmitter, wherein the group ID management request message includes information about at least one group ID which is intended to be allocated to the receiver for multi user-multiple input multiple output (MU-MIMO) transmission, and the information about the at least one group ID indicates each group ID and a spatial stream set position for the each group ID; transmitting a first group ID management response message to the transmitter, wherein the group ID management response message indicates admission or adjustment for allocation of the at least one group ID; and receiving at least one multi-user packet from the transmitter, wherein the multi-user packet is transmitted using MU-MIMO transmission.

18 Claims, 8 Drawing Sheets

(51) Int. Cl.
*H04B 7/04* (2006.01)
*H04B 7/02* (2006.01)
*H04W 84/12* (2009.01)

(56) References Cited

U.S. PATENT DOCUMENTS

2010/0177757 A1 7/2010 Kim et al.
2011/0002219 A1 1/2011 Kim et al.
2012/0039266 A1* 2/2012 Abraham et al. ............. 370/329
2012/0120931 A1* 5/2012 Abraham et al. ............. 370/338
2012/0218982 A1* 8/2012 Lee ........................ H04L 1/0009
  370/338
2012/0269183 A1* 10/2012 Sohn ...................... H04L 1/0025
  370/338
2012/0327838 A1* 12/2012 Seok ........................ H04W 4/06
  370/312
2013/0010708 A1* 1/2013 Abraham et al. ............. 370/329
2013/0064166 A1* 3/2013 Calcev .................... H04W 4/08
  370/312

OTHER PUBLICATIONS

U.S. Appl. No. 61/382,859, filed Sep. 14, 2010.*

* cited by examiner

METHOD FOR TRANSMITTING AND RECEIVING PACKET FOR MULTI USER IN WIRELESS LOCAL AREA NETWORK AND APPARATUS FOR THE SAME

CROSS-REFERENCE TO RELATED APPLICATIONS

This application is the National Stage filing under 35 U.S.C. 371 of International Application No. PCT/KR2012/001308, filed on Feb. 21, 2012, which claims the benefit of U.S. Provisional Application Ser. Nos. 61/447,086, filed on Feb. 27, 2011, 61/449,091, filed on Mar. 4, 2011, and 61/449,701, filed on Mar. 6, 2011, the contents of which are all hereby incorporated by reference herein in their entirety.

TECHNICAL FIELD

The present invention relates to wireless communications, and more particularly, to a method for transmitting and receiving a multi-user packet in a wireless local area network system and an apparatus supporting the method.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

With the widespread use of the WLAN and the diversification of applications using the WLAN, there is a recent demand for a new WLAN system to support a higher throughput than a data processing rate supported by the IEEE 802.11n. A next-generation WLAN system supporting a very high throughput (VHT) is a next version of the IEEE 802.11n WLAN system, and is one of IEEE 802.11 WLAN systems which have recently been proposed to support a data processing rate of above 1 Gbps in a MAC service access point (SAP).

The plurality of STAs, MU-MIMO paired with the AP, may have different capabilities. In this case, a supportable bandwidth, modulation coding scheme (MCS), forward error correction (FEC), etc., may vary depending on an STA type, usage, channel environment, etc.

In a WLAN system supporting MU-MIMO transmission, transmission target STAs are grouped into a group for MU-MIMO transmission. The transmission target STA group can be identified by a group ID. Meanwhile, since one STA can be included in at least one transmission target STA group, at least one group ID can be allocated.

Meanwhile, as the WLAN system applies to a broader area and a wireless apparatus supporting the WLAN is distributed actively, there may be a problem in that a group ID is overlappingly allocated to STAs. In MU-MIMO transmission, the group ID corresponds to information identifying which STA is a transmission target STA, and thus the overlappingly allocated group ID may be a factor that obstructs MU-MIMO transmission. Therefore, a method supporting packet transmission and reception for MU is required in a WLAN system in which there is a possibility that a group ID is overlappingly allocated.

SUMMARY OF INVENTION

Technical Problem

The present invention provides a method for transmitting and receiving a multi-user packet in a wireless local area network system and an apparatus supporting the method.

Solution to Problem

In a aspect, a method of receiving a multi-user packet by a receiver in a wireless local area network system. The method includes: receiving a first group identifier (ID) management request message from a transmitter, wherein the group ID management request message includes information about at least one group ID which is intended to be allocated to the receiver for multi user-multiple input multiple output (MU-MIMO) transmission, and the information about the at least one group ID indicates each group ID and a spatial stream set position for the each group ID; transmitting a first group ID management response message to the transmitter, wherein the group ID management response message indicates admission or adjustment for allocation of the at least one group ID; and receiving at least one multi-user packet from the transmitter, wherein the multi-user packet is transmitted using MU-MIMO transmission.

The method may further include determining whether to admit allocation of the at least one group ID by comparing the at least one group ID and at least one allocated group ID, wherein the at least one allocated group ID is allocated by another transmitter.

If the same group ID does not exist in the at least one group ID and the at least one allocated group ID, the first group ID management response message may indicate admission for allocation of the at least one group ID.

If the same group ID exists in the at least one group ID and the at least one allocated group ID and if a spatial stream set position for the group ID corresponding to the same group ID is equal to a spatial stream set position for an allocated group ID corresponding to the same group ID, the first group ID management response message may indicate admission for allocation of the at least one group ID.

The first group ID management response message may include the information about the at least one group ID.

The multi-user packet may be transmitted together with one group ID among the at least one group ID.

The method may further include: transmitting an acknowledgement message for the first group ID management request message before transmission of the first group ID management response message.

If the same group ID exists in the at least one group ID and the at least one allocated group ID and if a spatial stream set position for the group ID corresponding to the same group ID is not equal to a spatial stream set position for the allocated group ID corresponding to the same group ID, the first group ID management response message may indicate adjustment for allocation of the at least one group ID.

The first group ID management response message may include information about the at least one allocated group ID.

The method may further include: receiving a second group ID management request message from the transmitter. The second group ID management request message may include information about at least one adjusted group ID which is intended to be allocated to the receiver. The at least one adjusted group ID may be determined based on the information about the at least one allocated group ID.

The multi-user packet may be transmitted together with one group ID among the at least one adjusted group ID.

The method may further include transmitting an acknowledgement message for the first group ID management request message before transmission of the first group ID management response message.

The first group ID management response message may include information about the same group ID.

The method may further include receiving a second group ID management request message from the transmitter. The second group ID management request message may include information about at least one adjusted group ID which is intended to be allocated to the receiver. The at least one adjusted group ID may be determined based on the information about the same group ID.

The multi-user packet may be transmitted together with one group ID among the at least one adjusted group ID.

The method may further include transmitting an acknowledgement message for the first group ID management request message before transmission of the first group ID management response message.

In another aspect, a wireless apparatus is provided. The apparatus includes: a transceiver for transmitting and receiving a radio signal; and a processor operationally coupled to the transceiver. The processor is configured for: receiving a first group identifier (ID) management request message from a transmitter, wherein the group ID management request message includes information about at least one group ID which is intended to be allocated to the receiver for multi user-multiple input multiple output (MU-MIMO) transmission, and the information about the at least one group ID indicates each group ID and a spatial stream set position for the each group ID; transmitting a first group ID management response message to the transmitter, wherein the group ID management response message indicates admission or adjustment for allocation of the at least one group ID; and receiving at least one multi-user packet from the transmitter, wherein the multi-user packet is transmitted using MU-MIMO transmission.

In still another aspect, a method of receiving a multi-user packet by a receiver in a wireless local area network system is provided. The method includes: receiving a first group identifier (ID) management request message from a first transmitter, wherein the group ID management request message includes information about at least one group ID which is intended to be allocated to the receiver for multi user-multiple input multiple output (MU-MIMO) transmission, and the information about the at least one group ID indicates each group ID and a spatial stream set position for the each group ID; transmitting a first group ID management response message to a second transmitter, wherein the group ID management response message includes the information about the at least one group ID; and receiving a multi-user packet from the first transmitter, wherein the multi-user packet is transmitted using MU-MIMO transmission.

Advantageous Effects of Invention

According to embodiments of the present invention, when a group identifier (ID) is allocated by an access point (AP), a station (STA) determines whether the group ID required to be allocated is overlappingly allocated, and if it is overlappingly allocated, whether there is a possibility that the group ID collides with a group ID allocated by another AP. If there is the possibility of collision occurrence, the STA can request the AP not to be included in a transmission target STA group indicated by the group ID, or can request the AP to set a spatial stream set position for the group ID to be equal to a spatial stream set position for a group ID allocated by another AP. In this manner, data transmission and reception based on normal multi user-multiple input multiple output (MU-MIMO) transmission can be ensured in a wireless location area network (WLAN) system in which a group ID may be overlappingly allocated.

MODE FOR THE INVENTION

Figure 1:
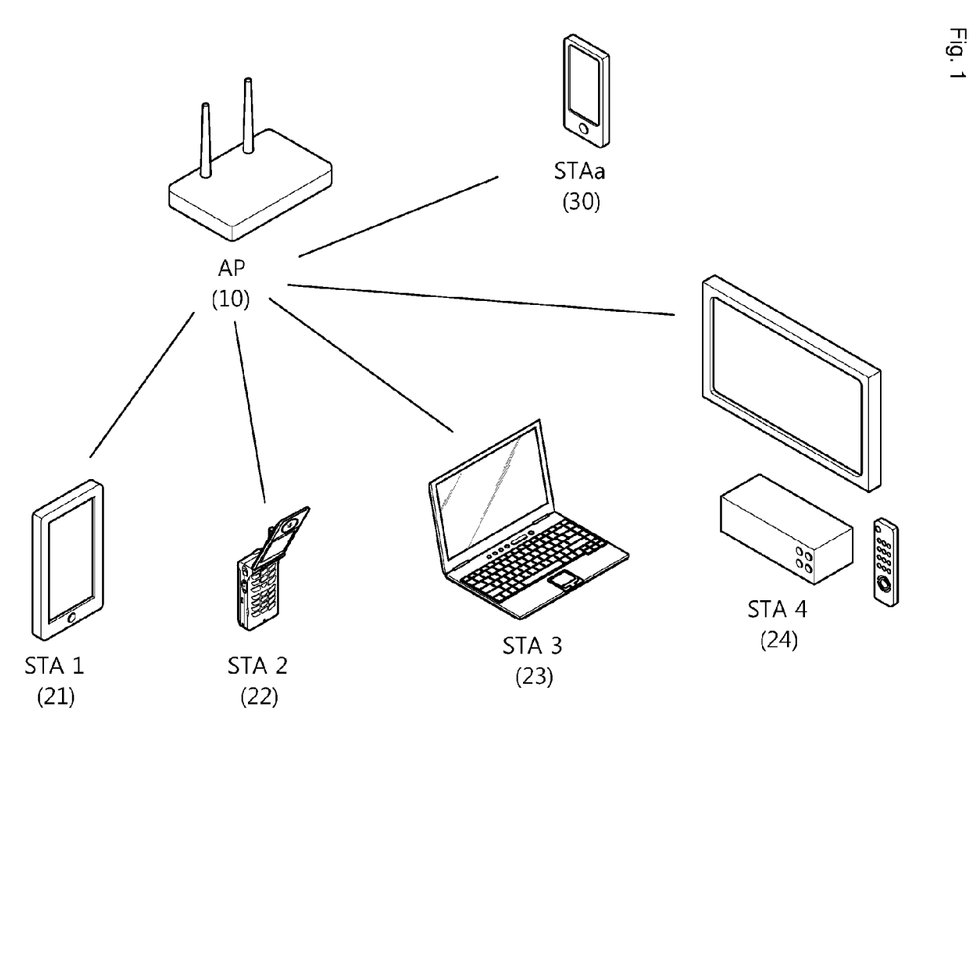
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area.

An infrastructure BSS includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

An IEEE 802.11 MAC protocol, together with a DCF, provides a Hybrid Coordination Function (HCF) based on a Point Coordination Function (PCF) in which a reception AP or a reception STA or both periodically poll a data frame using the DCF and a polling-based synchronous access scheme. The HCF includes Enhanced Distributed Channel Access (EDCA) in which a provider uses an access scheme for providing a data frame to a number of users as a contention-based scheme and HCF Controlled Channel Access (HCCA) employing a non-contention-based channel access scheme employing a polling mechanism. The HCF includes a medium access mechanism for improving the Quality of Service (QoS) of a WLAN and can transmit QoS data both in a Contention Period (CP) and a Contention-Free Period (CFP).

Figure 2:
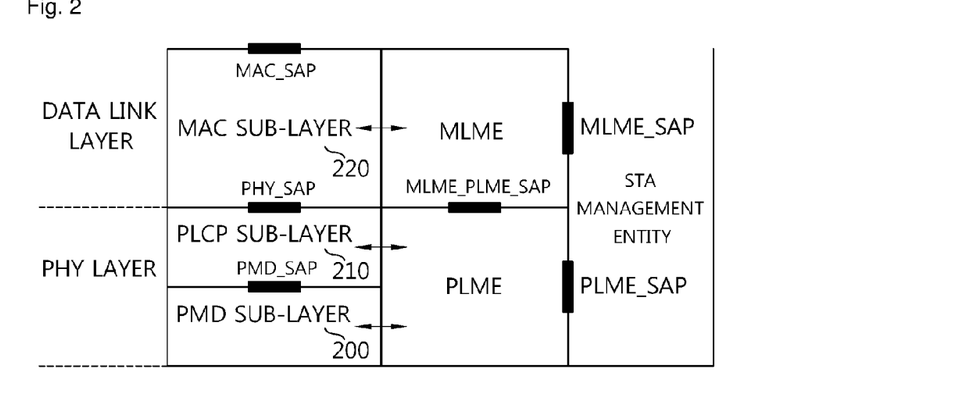
FIG. 2 shows a physical layer architecture of a WLAN system supported by IEEE 802.11.

FIG. 2 shows a physical layer architecture of a WLAN system supported by IEEE 802.11.

The IEEE 802.11 PHY architecture includes a PHY layer management entity (PLME), a physical layer convergence procedure (PLCP) sub-layer 210, and a physical medium dependent (PMD) sub-layer 200. The PLME provides a PHY management function in cooperation with a MAC layer management entity (MLME). The PLCP sub-layer 210 located between a MAC sub-layer 220 and the PMD sub-layer 200 delivers to the PMD sub-layer 200 a MAC protocol data unit (MPDU) received from the MAC sub-layer 220 under the instruction of the MAC layer, or delivers to the MAC sub-layer 220 a frame received from the PMD sub-layer 200. The PMD sub-layer 200 is a lower layer of the PDCP sub-layer and serves to enable transmission and reception of a PHY entity between two STAs through a radio medium. The MPDU delivered by the MAC sub-layer 220 is referred to as a physical service data unit (PSDU) in the PLCP sub-layer 210. Although the MPDU is similar to the PSDU, when an aggregated MPDU (A-MPDU) in which a plurality of MPDUs are aggregated is delivered, individual MPDUs and PSDUs may be different from each other.

The PLCP sub-layer 210 attaches an additional field including information required by a PHY transceiver to the PSDU in a process of receiving the PSDU from the MAC sub-layer 220 and delivering it to the PMD sub-layer 200. The additional field attached to the PSDU in this case may be a PLCP preamble, a PLCP header, tail bits required to reset an convolution encoder to a zero state, etc. The PLCP sub-layer 210 receives a TXVECTOR parameter delivered from the MAC sub-layer. The TXVECTOR parameter includes control information required to generate and transmit a PLCP protocol data unit (PPDU) and control information required by the reception STA to receive and interpret the PPDU. The PLCP sub-layer 210 uses information included in the TXVECTOR parameter when generating the PPDU including the PSDU.

The PLCP preamble serves to allow a receiver to prepare a synchronization function and antenna diversity before the PSDU is transmitted. The data field may include a coded bit sequence obtained by encoding a bit sequence including a PSDU to which padding bits, a service field including bit sequence for initializing a scrambler and tail bits are attached. In this case, either binary convolutional coding (BCC) encoding or low density parity check (LDPC) encoding can be selected as an encoding scheme according to an encoding scheme supported in an STA that receives the PPDU. The PLCP header includes a field that contains information on a PPDU to be transmitted, which will be described below in greater detail with reference to FIG. 3.

The PLCP sub-layer 210 generates a PPDU by attaching the aforementioned field to the PSDU and transmits the generated PPDU to a reception STA via the PMD sub-layer. The reception STA receives the PPDU, acquires information required for data recovery from the PLCP preamble and the PLCP header, and recovers the data. The PLCP sub-layer of the reception STA delivers an RXVECTOR parameter including control information included in a PLCP preamble and a PLCP header to the MAC sub-layer so that the PPDU can be interpreted and data can be acquired in a reception state.

The WLAN system supports a transmission channel of more continuous 160 MHz and non-continuous 80+80 MHz bands to support a higher throughput. In addition, the WLAN system supports a multi user-multiple input multiple output (MU-MIMO) transmission scheme. An AP and/or an STA which intends to transmit data in the WLAN system supporting the MU-MIMO transmission scheme can transmit data packets simultaneously to at least one or more reception STAs which are MU-MIMO paired.

Referring back to FIG. 1, in the WLAN system as shown in the drawing, the AP 10 can simultaneously transmit data to an STA group including at least one STA among a plurality of STAs 21, 22, 23, 24, and 30 associated with the AP 10. Although it is shown in FIG. 1 that the AP performs MU-MIMO transmission to the STAs, in a WLAN system supporting a tunneled direct link setup (TDLS) or direct link setup (DLS) and a mesh network, an STA which intends to transmit data can transmit a PPDU to the plurality of STAs by using the MU-MIMO transmission scheme. Hereinafter, a case where the AP transmits the PPDU to the plurality of STAs according to the MU-MIMO transmission scheme will be described for example.

Data to be transmitted to each STA can be transmitted through a different spatial stream. A data packet to be transmitted by the AP 10 is a PPDU generated and transmitted in a physical layer of the WLAN system or a data field included in a PPDU, and can be referred to as a frame. That is, the data field included in the PPDU for SU-MIMO and/or MU-MIMO can be called a MIMO packet. Among them, a PPDU for MU can be referred to as a MU packet. It is assumed in the embodiment of the present invention that the STA1 21, the STA2 22, the STA3 23, and the STA4 24 belong to a transmission target STA group which is MU-MIMO paired with the AP 10. In this case, data may not be transmitted to a specific STA of the transmission target STA group since a spatial stream is not allocated thereto. Meanwhile, although the STAa 30 is associated with the AP, it is assumed that the STAa 30 is an STA not included in the transmission target STA group.

When the AP transmits a PPDU to a plurality of STAs by using a MU-MIMO transmission scheme, the AP transmits the PPDU by inserting information indicating a group ID into the PPDU as control information. When the STA receives the PPDU, the STA confirms the group ID field to determine whether the STA is a member STA of a transmission target STA group. If it is determined that the STA is the member STA of the transmission target STA group, the STA can determine at which position a spatial stream set to be transmitted to the STA is located among all spatial streams. Since the PPDU includes information indicating the number of spatial streams allocated to a reception STA, the STA can receive data by searching for spatial streams allocated to the STA.

Figure 3:
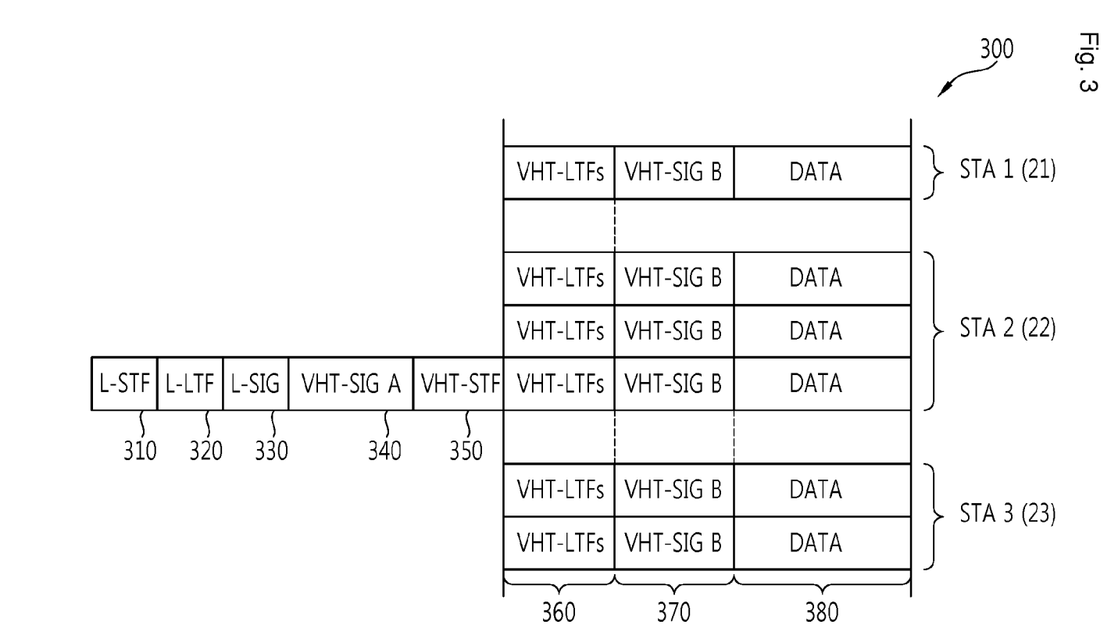
FIG. 3 shows an example of a PPDU format used in a WLAN system.

FIG. 3 shows an example of a PPDU format used in a WLAN system.

Referring to FIG. 3, a PPDU 300 includes an L-STF field 310, an L-LTF field 320, an L-SIG field 330, a VHT-SIGA field 340, a VHT-STF field 350, a VHT-LTF field 360, a VHT-SIGB field 370, and a data field 380.

A PLCP sub-layer constituting a PHY converts a PSDU delivered from a MAC layer into the data field 380 by appending necessary information to the PSDU, generates the PPDU 300 by appending several fields such as the L-STF field 310, the L-LTF field 320, the L-SIG field 330, the VHT-SIGA field 340, the VHT-STF field 350, the VHT-LTF field 360, the VHT-SIGB field 370, or the like, to the data field and delivers the PPDU 300 to one or more STAs through a physical medium dependent (PMD) sub-layer constituting the PHY. Control information required by the PLCP sub-layer to generate the PPDU and control information used by a reception STA to interpret the PPDU and transmitted by being included in the PPDU are provided from a TXVECTOR parameter delivered from the MAC layer.

The L-SFT 310 is used for frame timing acquisition, automatic gain control (AGC) convergence, coarse frequency acquisition, etc.

The L-LTF field 320 is used for channel estimation for demodulation of the L-SIG field 330 and the VHT-SIGA field 340.

The L-SIG field 330 is used when the L-STA receives the PPDU 300 and interprets it to acquire data. The L-SIG field 330 includes a rate sub-field, a length sub-field, a parity bit and tail field. The rate sub-field is set to a value indicating a bit state for data to be currently transmitted.

The length sub-field is set to a value indicating an octet length of a PSDU to be transmitted by the PHY layer at the request of the MAC layer. In this case, an L_LENGTH parameter which is a parameter related to information indicating the octet length of the PSDU is determined based on a TXTIME parameter which is a parameter related to a transmission time. TXTIME indicates a transmission time determined for PPDU transmission including the PSDU by the PHY layer in association with a transmission time requested for transmission of the PSDU. Therefore, since the L_LENGTH parameter is a time-related parameter, the length sub-field included in the L-SIG field 330 includes information related to the transmission time.

The VHT-SIGA field 340 includes control information (or signal information) required by STAs for receiving the PPDU to interpret the PPDU 300. The VHT-SIGA 340 is transmitted on two OFDM symbols. Accordingly, the VHT-SIGA field 340 can be divided into a VHT-SIGA1 field and a VHT-SIGA2 field. The VHT-SIGA1 field includes channel bandwidth information used for PPDU transmission, identifier information related to whether space time block coding (STBC) is used, information indicating either SU or MU-MIMO as a PPDU transmission scheme, and, if the transmission scheme is MU-MIMO, information indicating a transmission target STA group of a plurality of STAs which are MU-MIMO paired with the AP, and information regarding a spatial stream allocated to each STA included in the transmission target STA group. The VHT-SIGA2 field includes information related to a short guard interval (GI).

The information indicating the MIMO transmission scheme and the information indicating the transmission target STA group can be implemented as one piece of MIMO indication information, and for example, can be implemented as a group ID. The group ID can be set to a value having a specific range. A specific value in the range indicates an SU-MIMO transmission scheme, and other values can be used as an identifier for a corresponding transmission target STA group when the MU-MIMO transmission scheme is used to transmit the PPDU 300.

When the group ID indicates that the PPDU 300 is transmitted using the SU-MIMO transmission scheme, the VHT-SIGA2 field includes coding indication information indicating whether a coding scheme applied to the data field is binary convolution coding (BCC) or low density parity check (LDPC) coding and modulation coding scheme (MCS) information regarding a channel between a transmitter and a receiver. In addition, the VHT-SIGA2 field can include an AID of a transmission target STA of the PPDU and/or a partial AID including a part of bit-sequence of the AID.

When the group ID indicates that the PPDU 300 is transmitted using the MU-MIMO transmission scheme, the VHT-SIGA field 300 includes coding indication information indicating whether a coding scheme applied to the data field which is intended to be transmitted to MU-MIMO paired reception STAs is BCC or LDPC coding. In this case, MCS information for each reception STA can be included in the VHT-SIGB field 370.

The VHT-STF 350 is used to improve performance of AGC estimation in MIMO transmission.

The VHT-LTF 360 is used when the STA estimates a MIMO channel. Since the next generation WLAN system supports MU-MIMO, the VHT-LTF field 360 can be configured by the number of spatial streams in which the PPDU 300 is transmitted. In addition, when full channel sounding is supported and is performed, the number of VHT-LTFs may increase.

The VHT-SIGB field 370 includes dedicated control information required when the plurality of MIMO-paired STAs receive the PPDU 300 to acquire data. Therefore, the STA may be designed such that the VHT-SIGB field 370 is decoded only when the control information included in the VHT-SIGA field 340 indicates that the currently received PPDU 300 is transmitted using MU-MIMO transmission. On the contrary, the STA may be designed such that the VHT-SIGB field 370 is not decoded when the control information in the VHT-SIGA field 340 indicates that the currently received PPDU 300 is for a single STA (including SU-MIMO).

The VHT-SIGB field 370 includes MCS information and rate-matching information for each STA. Further, the VHT-SIGB field 370 includes information indicating a PSDU length included in the data field for each STA. The information indicating the PSDU length is information indicating a length of a bit-sequence of the PSDU and can be indicated in the unit of octet. A size of the VHT-SIGB field 370 may differ according to the MIMO transmission method (MU-MIMO or SU-MIMO) and a channel bandwidth used for PPDU transmission.

The data field 380 includes data intended to be transmitted to the STA. The data field 380 includes a service field for initializing a scrambler and a PLCP service data unit (PSDU) to which a MAC protocol data unit (MPDU) of a MAC layer is delivered, a tail field including a bit sequence required to reset a convolution encoder to a zero state, and padding bits for normalizing a length of the data field.

In the WLAN system of FIG. 1, if the AP 10 intends to transmit data to the STA1 21, the STA2 22, and the STA3 23, then a PPDU may be transmitted to an STA group including the STA1 21, the STA2 22, the STA3 23, and the STA4 24. In this case, as shown in FIG. 2, no spatial stream may be allocated to the STA4 24, and a specific number of spatial streams may be allocated to each of the STA1 21, the STA2 22, and the STA3 23 and thus data can be transmitted. In the example of FIG. 2, one spatial stream is allocated to the STA1 21, three spatial streams are allocated to the STA2 22, and two spatial streams are allocated to the STA3 23.

For a MU-MIMO transmission scheme, a group ID can be allocated for a transmission target STA group. The AP transmits a group ID management frame including a group ID management information element in order to allocate a group ID to STAs supporting MU-MIMO transmission. Thus, the group ID can be allocated to the STAs before PPDU transmission. A plurality of group IDs can be allocated to one STA.

Figure 4:
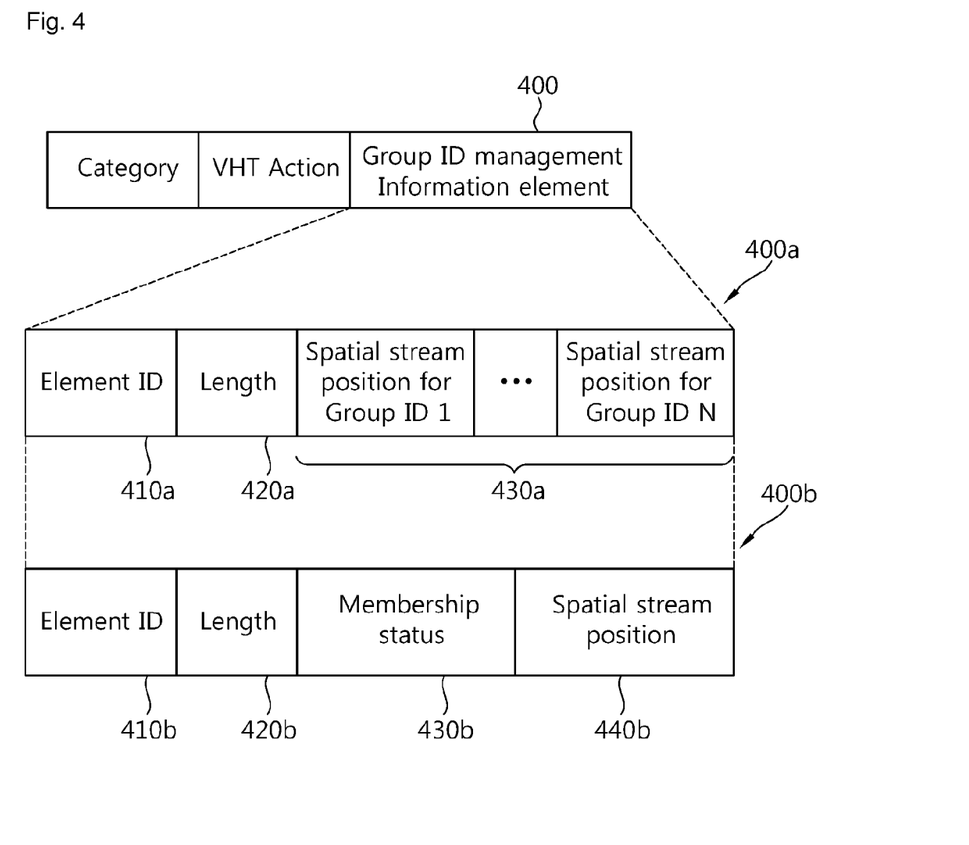
FIG. 4 is a diagram showing a group ID management frame format and a group ID management information element format.

FIG. 4 is a diagram showing a group ID management frame format and a group ID management information element format.

Referring to FIG. 4, a group ID management frame indicates that a corresponding frame is a management frame, and may include a VHT action field and a category field configured to indicate the group ID management frame used in a next generation WLAN system supporting MU-MIMO.

The group ID management frame includes a group ID management information element 400 including management information for a group ID. The group ID management information element 400 can implement group ID management information in various types.

For example, a group ID management information element 400a can include an element ID field 410a, a length field 420a, and a spatial stream position field 430a for at least one specific group ID. The number of spatial stream position fields 430a may be the total number of group IDs.

The spatial stream position field 430a can indicate, for each group ID, whether an STA for receiving the group ID management frame is included in a transmission target STA group indicated by the group ID and if the STA is included therein, can indicate at which position a spatial stream set allocated to the STA is located.

For example, if values of at least one spatial stream position field are 0, 1, 2, 4, 0, 0, 0, . . . , 0, 0, 0 in the group ID management information element received by the STA, it indicates that the STA is included in a transmission target STA group indicated by a group ID 2, a group ID 3, and a group ID 4. Further, it indicates that a $1^{st}$ spatial stream set is allocated to the group ID 2, a $2^{nd}$ spatial stream set is allocated to the group ID 3, and a $4^{th}$ spatial stream set is allocated to the group ID 4. Accordingly, the STA can receive data by using at least one spatial stream corresponding to a position of a pre-allocated spatial stream set when receiving a PPDU transmitted using a group ID indicating an STA group to which the STA is included.

For another example, a group ID management information element 400b can include an element ID field 410b, a length field 420b, a membership status field 430b, and a spatial stream position field 440b.

The membership status field 430b indicates whether the STA is included in a transmission target STA group indicated by a specific group ID. The spatial stream position field 440b indicates at which position a spatial stream set for the STA is located.

Since one AP manages a plurality of group IDs, membership status information provided to one STA needs to indicate whether the STA is included in a transmission target STA group indicated by each group ID managed by the AP. Therefore, the membership status information can be implemented in an array format of sub-fields indicating whether the STA is included in the transmission target STA group indicated by each group ID. Since spatial stream position information indicates a position of a spatial stream set for each group ID, it can be implemented in an array format of sub-fields indicating a position of a spatial stream set allocated to the STA for each group ID. In addition, the group ID management information element 400a can be interpreted as an example in which membership status information and spatial stream position information are implemented in one sub-field.

Meanwhile, a problem may occur in a multi-network scenario where the STA can receive a PPDU from two or more APs through MU-MIMO transmission or in a case where the same group ID is overlappingly allocated by APs to the STA in a wireless mesh network. Since the STA can receive a PPDU transmitted using MU-MIMO on the basis of a group ID, a position of a spatial stream, and the number of spatial streams, if the group ID is overlappingly allocated, a collision caused by data reception may occur with another STA. In addition, in a case where the STA cannot identify that PPDU transmission is not for the STA by using the group ID, even if the PPDU is not a data unit for the STA, this can be known through frame interpretation on a MAC layer by performing demodulation and decoding on a PHY layer, which may lead to an unnecessary operation of a reception STA.

The aforementioned problem may occur more frequently than a wireless mesh network. Therefore, an embodiment of the present invention described hereinafter is also applicable to mesh points which may be both a transmitter and a receiver. However, a typical next generation WLAN system in which a group ID is overlappingly allocated will be described hereinafter for example.

Figure 5:
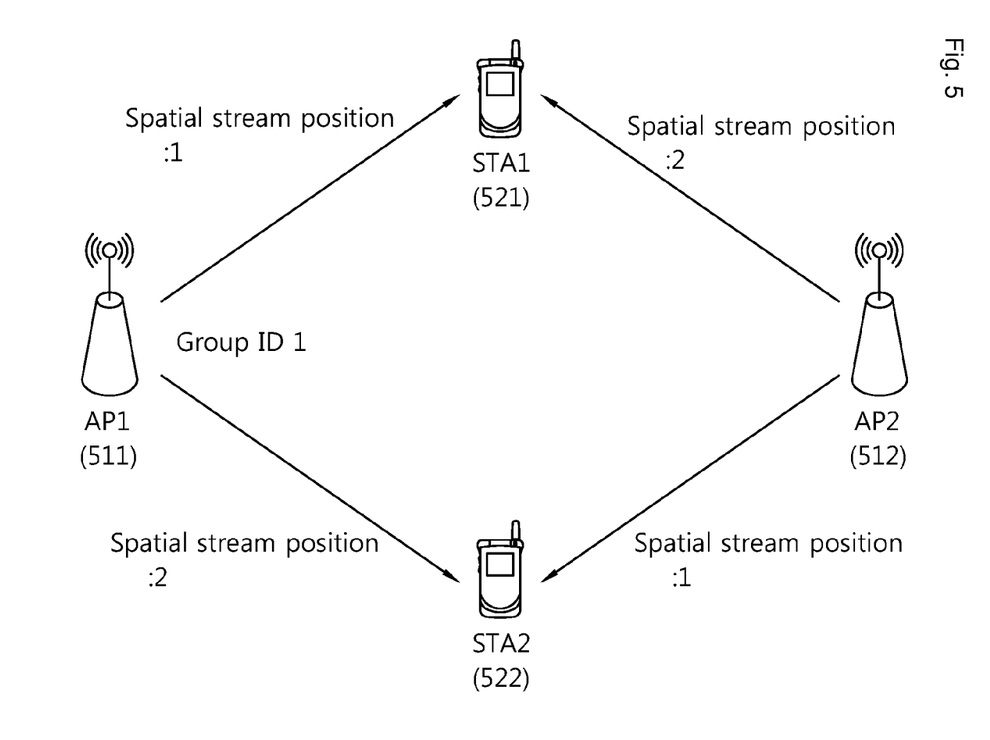
FIG. 5 is a diagram showing a WLAN environment to which an embodiment of the present invention is applicable.

FIG. 5 is a diagram showing a WLAN environment to which an embodiment of the present invention is applicable. It is assumed that both an AP and an STA which constitute the WLAN system support MU-MIMO transmission and reception.

Referring to FIG. 5, an AP1 511 allocates a group ID 1 to an STA1 521 and an STA2 522 to transmit a PPDU. In this case, for transmission of a data unit, the AP1 511 allocates a spatial stream set of a first position to the STA1 521 and allocates a spatial stream set of a second position to the STA2 522.

Similarly, an AP2 512 allocates a group ID 1 to the STA1 521 and the STA2 522 to transmit a PPDU. Meanwhile, the AP2 512 allocates a spatial stream set of a second position to the STA1 521, and allocates a spatial stream set of a first position to the STA2 522.

Upon receiving the PPDU transmitted using MU-MIMO, the STA1 521 confirms a group ID of a VHT-SIGA field of the PPDU in order to confirm whether the STA1 521 is included in a transmitter target STA group. If the group ID is 1, it can be known that the PPDU is transmitted by the AP1 521 or the AP2 522.

Subsequently, for correct reception, a signal corresponding to a pre-allocated spatial stream position must be received. However, since a position of a spatial stream set allocated for the group ID 1 is different between the PPDU transmitted by the AP1 511 and the PPDU transmitted by the AP2 512, the STA1 521 may not be able to correctly receive the PPDU. As such, when the group ID is overlappingly allocated, it may be difficult for a reception STA to correctly ensure a spatial stream set for receiving a PPDU, and as a result, correct MU-MIMO transmission and reception may not be supported. It can be expressed as a collision caused by an overlappingly allocated group ID. A method for solving the aforementioned problem will be described hereinafter in detail with reference to the accompanying drawings.

The aforementioned problem can be solved when an STA that receives a PPDU transmitted using MU-MIMO reports information about a group ID allocated to the STA and a spatial stream set position for the group ID to neighboring APs.

In the example of FIG. 5, when the STA1 521 receives a group ID management frame from the AP1 511, the STA1 521 reports the content of a group ID management information element of the group ID management frame to the AP2 512. For this, the STA1 521 can transmit a group ID announcement message to the STA2 521 by unicast or broadcast. The group ID announcement message may include information about a group ID allocated by the STA1 521 from the AP1 511 and/or a spatial stream set position for the group ID.

In the example of FIG. 5, the STA1 521 reports information about the group ID 1 allocated from the AP1 511 and/or a spatial stream set position on the group ID 1 to the AP2 512. Upon receiving the group ID announcement message, the AP2 512 can allocate another group ID except for the group ID 1 and can transmit a PPDU by using the allocated group ID. Alternatively, the AP2 512 can transmit a PPDU to the STA1 521 by using the group ID 1 such that the PPDU is transmitted based on the same spatial stream set position as the spatial stream set position for the group ID 1 allocated to the STA1 521 by the AP 511. Unlike the example of FIG. 5, when the AP2 512 does not allocate the group ID to the STA1 521, the AP2 512 can allocate the group ID to the STA1 521 by considering information included in the group ID announcement message.

Meanwhile, when a PPDU is transmitted by the AP by using an overlappingly allocated group ID before the group ID announcement message is transmitted, a method for solving this problem is required.

For this, an STA to which the group ID is overlappingly allocated may request the AP to cancel allocation of the group ID or to set the same position as a spatial stream set position for the overlappingly allocated group ID.

Figure 6:
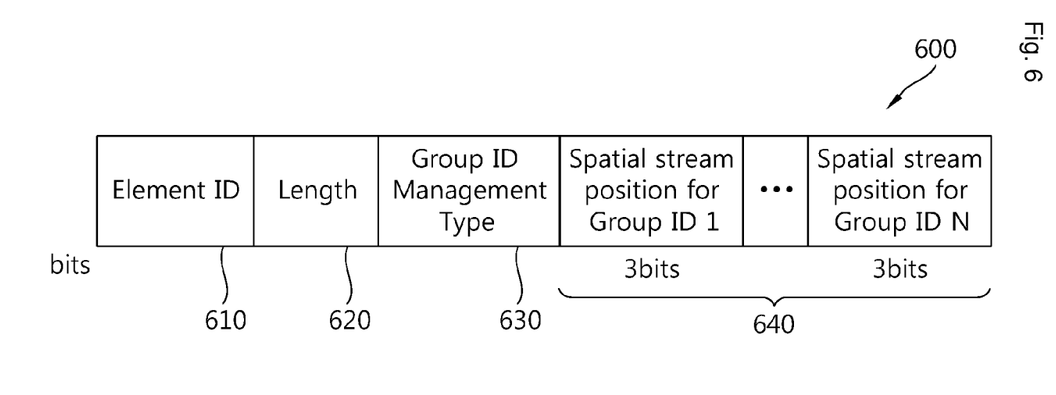
FIG. 6 shows a group ID management information element format according to an embodiment of the present invention.

FIG. 6 shows a group ID management information element format according to an embodiment of the present invention.

Referring to FIG. 6, a group ID management information element 600 may include an element ID field 610, a length field 620, a group ID management type field 630, and at least one spatial stream position field 640. The element ID field 610 indicates that a corresponding information element is a group ID management information element. The length field 620 indicates a length of the information element.

The group ID management type field 630 indicates a usage of information included in the group ID management information element 600. The group ID management type field 630 can be set to indicate allocation, announcement, or adjustment.

If the group ID management type field 630 indicates allocation, the group ID management information element can be used by the AP to allocate the group ID to the STA. In this case, at least one group ID management information element 600 can implement the same function as the group ID management information element 400 of FIG. 4.

If the group ID management type field 630 indicates announcement, the group ID management information element 600 can be used by the STA to announce information about the group ID allocated to the STA and/or a spatial stream position for the group ID to a neighboring AP. As described above, transmitting of the group ID announcement message by the STA to the neighboring AP can be implemented by transmitting a group ID management frame including a group ID management information element configured such that the group ID management type field 630 indicates announcement.

If the group ID management type field 630 indicates adjustment, the group ID management information element 600 can be used by the STA to request the neighboring AP to send an overlappingly allocated group ID to be adjusted and/or a spatial stream set position for the group ID. In addition, this field can also be used in a normal case in which the STA intends to change an allocated group ID and/or a spatial stream set position for the group ID, for example, a case in which the group ID is incorrectly allocated.

The at least one spatial stream position field 640 can be configured similarly to the spatial stream position field 430*a* of FIG. 4. The at least one spatial stream position field 640 can be interpreted differently according to a value indicated by the group ID management type field 630. That is, if allocation is indicated, the STA interprets this field as a group ID allocated to the STA and a position of a spatial stream set for the group ID, and if announcement is indicated, a reception AP interprets this field as a group ID pre-allocated to the STA or a spatial stream set position for the group ID. If adjustment is indicated, the AP may interpret corresponding fields as a group ID requested by the STA to be changed and/or a spatial stream set position for the group ID or may interpret the corresponding fields as a group ID pre-allocated to the STA and/or a spatial stream set position for the group ID.

In addition, the group ID management information element 600 can be implemented such that the membership status field 430*b* and the spatial stream position field 440*b* of FIG. 4 are included instead of the at least one spatial stream position field 640.

If the group ID management type field 630 indicates adjustment, information about all group IDs and spatial stream positions thereof may be included in the group ID management information element as described above, and only a specific group ID requested to be changed and a spatial stream set position for the group ID may be included. This can be expressed as shown in the group ID management information element format of FIG. 7.

Figure 7:
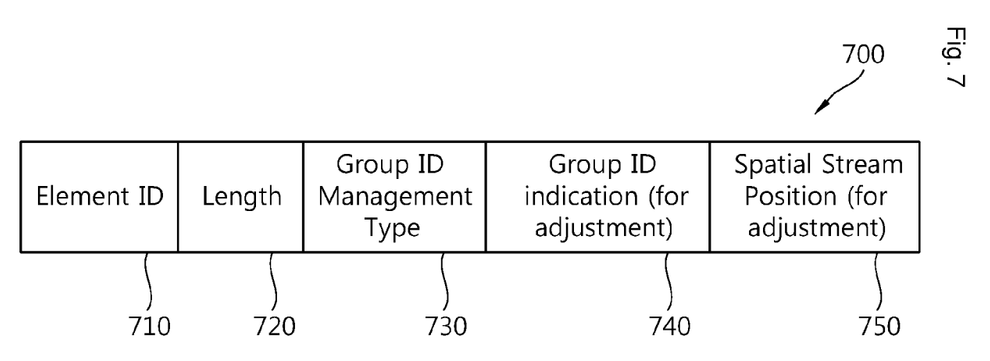
FIG. 7 shows another example of a group ID management information element format according to an embodiment of the present invention.

FIG. 7 shows another example of a group ID management information element format according to an embodiment of the present invention.

Referring to FIG. 7, a group ID management information element 700 may include an element ID field 710, a length field 720, a group ID management type field 730, a group ID indication field 740, and a spatial stream position field 750. The element ID field 710 and the length field 720 are the same as the fields 610 and 620 of FIG. 6. The group ID management type field 730 can be set to indicate adjustment.

The group ID indication field 740 can be set to indicate a group ID requested to be changed. The spatial stream position field 750 can be set to indicate a spatial stream position for a specific group ID requested to be changed. The number of included group ID indication fields may vary depending on the number of group IDs requested to be changed, and the number of spatial stream position fields may also vary.

Upon receiving a group ID management information element having the format of FIG. 7, a neighboring AP can recognize a group ID requested to be changed, and can selectively determine whether to change the spatial stream position or the group ID by using the spatial stream position field 750.

Meanwhile, as a method for solving a problem which may arise by an overlappingly allocated group ID and for supporting PPDU transmission and reception on the basis of a MU-MIMO transmission scheme, a PPDU transmission and reception method based on a group ID request/response can be proposed.

Figure 8:
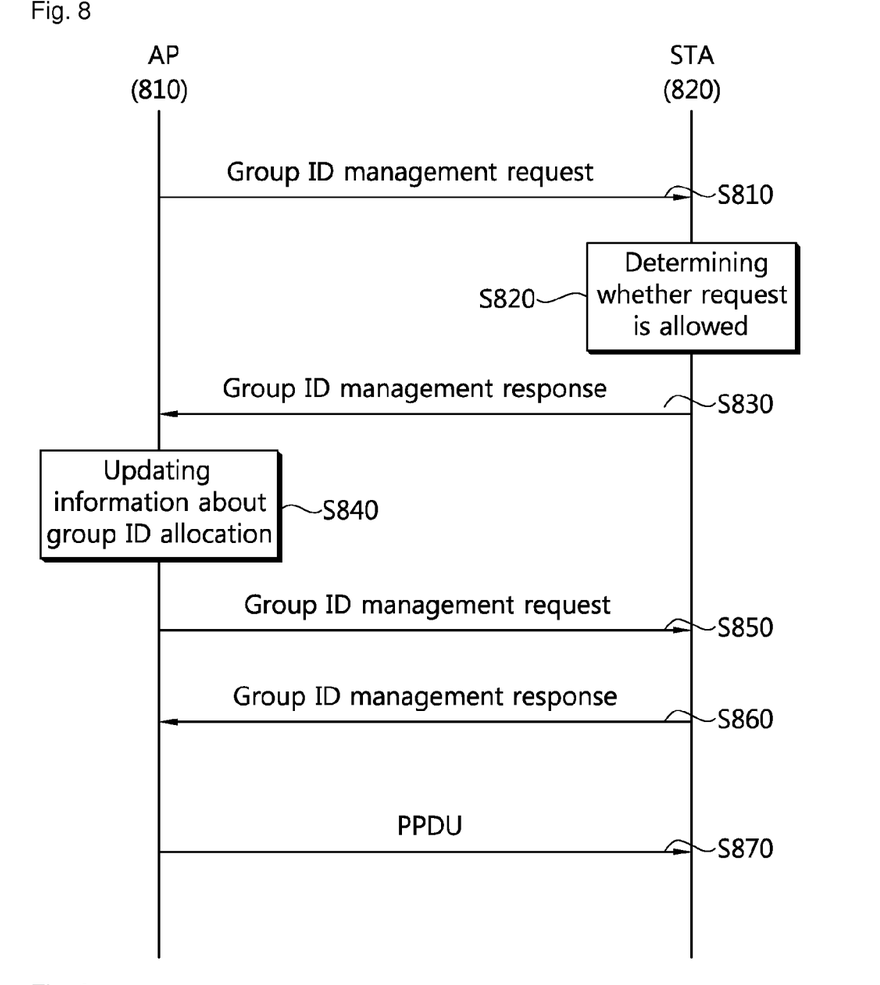
FIG. 8 is a flowchart showing a PPDU transmission and reception method based on a request/response according to an embodiment of the present invention.

FIG. 8 is a flowchart showing a PPDU transmission and reception method based on a request/response according to an embodiment of the present invention.

Referring to FIG. 8, an AP 810 determines a group ID to be allocated to an STA 820 and a spatial stream set position for the group ID. The AP 810 transmits a group ID management request message to the STA 820 to request group ID allocation (step S810). The group ID management request message can be implemented by transmitting the aforementioned group ID management frame for group ID allocation. The group ID included in the request message transmitted by the AP 810 and the spatial stream set position may not be valid until there is an admission response.

The STA 820 determines whether to admit the request of the AP 810 (step S820). The STA 820 can determine whether to allow the request by comparing a group ID pre-allocated by another AP and a spatial stream set position for the group ID with a group ID included in the request message transmitted by the AP 810 and a spatial stream set position for the group ID. Whether to allow the request can be determined according to whether a problem may occur when a same group ID is overlappingly allocated or a spatial stream set allocated by each AP has a different position with respect to the same group ID, as shown in the example of FIG. 5.

If it is determined not to admit the group ID requested by the AP 810 and the spatial stream position for the group ID, the STA 820 transmits a group ID management response message to the AP 810 to request the AP 810 to adjust allocation of the group ID and the spatial stream set position (step S830).

The group ID management response message transmitted by the STA 820 can be implemented in various forms. For example, it can be implemented in such a manner that a group ID management frame including a group ID management information element of FIG. 6 or FIG. 7 is transmitted by setting the group ID management type field to announcement or adjustment. Alternatively, it can be implemented by transmitting a group ID management frame not including a group ID management type field.

The group ID management information element may include information indicating whether the STA is included in a transmission target STA group for all group IDs as shown in FIG. 6 and information indicating a spatial stream set position for the group ID. By using the included information, the STA 820 may request to prohibit allocation with respect to a group ID which may collide due to overlapping allocation, or may request to allocate the same spatial set position as the spatial stream set position previously allocated by the AP with respect to the group ID.

The group ID management information element may include information about a group ID requested to be adjusted and a spatial stream set position for the group ID as shown in FIG. 7. The group ID requested to be adjusted may be an overlappingly allocated group ID. In addition, information about a group ID allocated by another AP and a spatial stream set position for the group ID can be included in the group ID management information.

Upon receiving the group ID management response message, the AP 810 can update a part or entirety of information about group ID allocation on the basis of information included in the response message (step S840).

Figure 9:
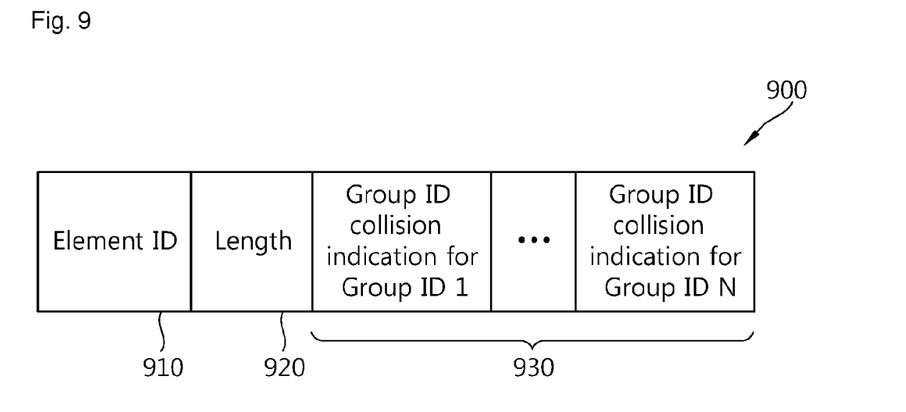
FIG. 9 is a diagram showing an example of a group ID management information element format according to an embodiment of the present invention.

As another example of implementing transmission of the group ID management response message, it can be proposed to transmit a group ID management frame having a group ID management information element format of FIG. 9.

FIG. 9 is a diagram showing an example of a group ID management information element format according to an embodiment of the present invention.

Referring to FIG. 9, a group ID management information element 900 includes an element ID field 910, a length field 920, and a group ID collision indication field 930 for at least one specific group ID. The element ID field 910 indicates that a corresponding information element is the group ID management information element 900. The length field 920 indicates a length of the group ID management information element 900.

Each group ID collision indication field can be set to indicate whether a group ID collision occurs by overlapping allocation of a specific group ID. The number of group ID collision indication fields may be the total number of group IDs that can be allocated. If a group ID collision indication field for a specific group ID is set to 1, it implies that a collision occurs at the group ID.

Referring back to FIG. 8, upon receiving a group ID information element having the format of FIG. 9, the AP 810 can update information about group ID allocation so that the STA 820 is not included in a transmission target STA group of the group ID at which a collision occurs (step S840).

After updating the information about the group ID allocation, the AP 810 may retransmit the group ID management request message to the STA 820 in order to rerequest allocation of the group ID (step S850), and the STA 820 may transmit a group ID management response message to the AP 810 to announce whether to admit the request (step S860). If it is determined to allow the request of the AP 810, the STA 820 may transmit a group ID management response message to the AP 810 to indicate that the request is allowed.

After receiving from the STA 820 the group ID response message indicating that the requested allocation of the group ID and the spatial stream set position is admitted, the AP 810 can transmit a PPDU to the STA 820 by using a MU-MIMO transmission scheme (step S870).

The method based on the group ID management request/response shown in the example of FIG. 8 can be implemented in various forms. It can be implemented such that response message transmission of the STA is achieved immediately after request message transmission of the AP, and can be implemented such that the STA first transmits an acknowledgement message in response to the request message of the AP and thereafter transmits a response message. Even if the acknowledgment message is received from the STA, the AP does not determine that an allocated group ID and a spatial stream set position for the group ID are valid until a final response for group ID allocation is received.

The aforementioned method of transmitting the acknowledgment message before transmission of a response message can result in efficiency of a group ID allocation protocol in a sense that the STA can ensure a time required to determine whether group ID allocation is appropriate and that the AP can determine whether to wait for a response message or whether to retransmit a request message.

Meanwhile, as another method for solving a collision problem of a group ID, the STA may be configured such that the STA cannot receive a PPDU transmitted using MU-MIMO simultaneously from two or more APs. That is, the STA can be configured such that a PPDU transmitted using MU-MIMO cannot be received from another AP when it is configured to be able to receive a PPDU transmitted using MU-MIMO from one AP.

In case of SU-MIMO transmission, the group ID collision problem does not occur since a special group ID is allocated in this case and the group ID is different from a group ID used in MU-MIMO transmission. In addition, in case of SU-MIMO transmission, a spatial stream confusion problem does not occur since all spatial streams are used by being allocated to one STA.

A PPDU transmission and reception method based on group ID management request/response message transmission and reception has been described above with reference to FIG. 8. Meanwhile, if the group ID management is performed always by using request/response message transmission and reception, it may be ineffective in a situation where an overlappingly allocated group ID does not cause collision occurrence. Therefore, when the AP transmits a message for group ID allocation to the STA, whether transmission will be performed by simply including only information for group ID allocation or whether to transmit and receive a group ID management response/request message can be selectively implemented. For this, transmission can be performed by allowing information indicating whether to admit a response of the STA to be further included in the group ID allocation message.

Figure 10:
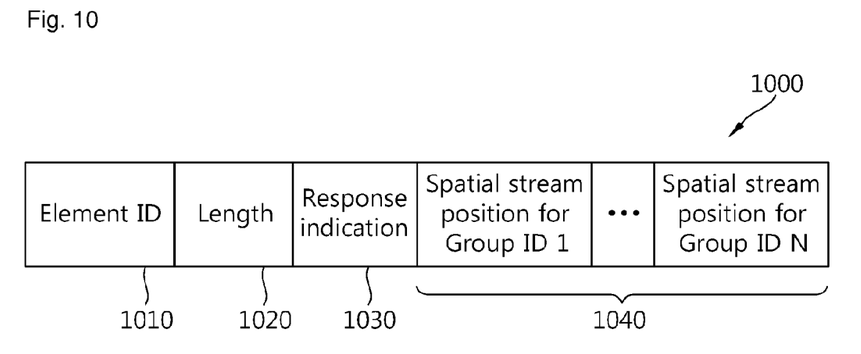
FIG. 10 is a diagram showing another embodiment of a group ID information element according to an embodiment of the present invention.

FIG. 10 is a diagram showing another embodiment of a group ID information element according to an embodiment of the present invention.

Referring to FIG. 10, a group ID information element 1000 includes an element ID field 1010, a length field 1020, a response indication field 1030, and at least one spatial stream set position field 1040. The element ID field 1010, the length field 1020, and the at least one spatial stream set position field 1040 are the same as those described above, and thus detailed description thereof will be omitted.

The response indication field 1030 can indicate whether a group ID and a spatial stream set position will be allocated to an STA that receives the group ID information element 1000 and whether the STA will respond to indicate whether to admit the allocation.

If the response indication field 1030 is set to 0, upon receiving a group ID management information element, the STA can confirm whether it is correctly received and can transmit an acknowledgment message to the AP.

If the response indication field 1030 is set to 1, upon receiving the group ID management information element, the STA determines whether a collision occurs caused by overlapping allocation of a group ID, and transmits a group ID management response message to the AP in response thereto. The group ID management response message can be performed as described in the aforementioned example.

In the aforementioned embodiments of the present invention, a message, information included in the message, and operations of an AP and an STA depending on the message and information do not exist independently for the respective embodiments. Thus, these elements can be combined to constitute an embodiment satisfying the purpose of the embodiments of the present invention.

By using the aforementioned PPDU transmission and reception method according to the embodiment of the present invention, the STA can prevent overlapping allocation of the group ID or can prevent collision occurrence even if overlapping allocation occurs, thereby being able to support correct PPDU transmission and reception. In addition, since the STA can report to the AP a group ID required to be modified, the AP can transmit a PPDU by avoiding the group ID.

Figure 11:
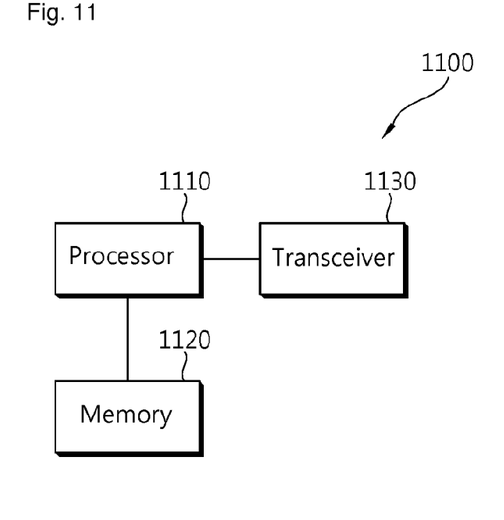
FIG. 11 is a block diagram of a wireless apparatus to which an embodiment of the present invention is applicable.

FIG. 11 is a block diagram of a wireless apparatus to which an embodiment of the present invention is applicable. The wireless apparatus may be an AP or an STA.

Referring to FIG. 11, a wireless apparatus 1100 includes a processor 1110, a memory 1120, and a transceiver 1130. The transceiver 1130 transmits and/or receives a radio signal, and implements an IEEE 802.11 PHY layer. The processor 1110 is operationally coupled to the transceiver 1130, and implements IEEE 802.11 MAC and PHY layers. The processor 1110 can be configured to generate and transmit a message for allocation, announcement, and adjustment of a group ID. The processor 1110 can be configured to change or update information about group ID allocation or determine whether to admit a group ID to be allocated. The processor 1110 can be configured to implement the aforementioned embodiment of the present invention described with reference to FIG. 4 to FIG. 10.

The processor 1110 and/or the transceiver 1130 may include an application-specific integrated circuit (ASIC), a separate chipset, a logic circuit, and/or a data processing unit. When the embodiment of the present invention is implemented in software, the aforementioned methods can be implemented with a module (i.e., process, function, etc.) for performing the aforementioned functions. The module may be stored in the memory 1120 and may be performed by the processor 1110. The memory 1120 may be located inside or outside the processor 1110, and may be coupled to the processor 1110 by using various well-known means.

The invention claimed is:
1. A method of a receiver in a wireless local area network system receiving multi-user packets, the method comprising:

receiving a first group identifier (ID) management request message from a first transmitter, the first group ID management request message including information related to at least one group ID intended for allocation to the receiver for multi user-multiple input multiple output (MU-MIMO) transmission, the information indicating each of the at least one group ID and a spatial stream set position for each of the at least one group ID;

transmitting a first group ID management response message to the first transmitter, the first group ID management response message indicating admission or adjustment for allocation of the at least one group ID; and receiving at least one multi-user packet from the first transmitter via at least one spatial stream in a group ID determined based on the first group ID management response message, wherein the at least one multi-user packet is transmitted using MU-MIMO transmission.

2. The method of claim 1, further comprising:
determining whether to admit allocation of the at least one group ID by comparing the at least one group ID and at least one allocated group ID,
wherein the at least one allocated group ID is allocated by a second transmitter.

3. The method of claim 2, wherein the first group ID management response message indicates admission for allocation of the at least one group ID if a same group ID does not exist in both the at least one group ID and the at least one allocated group ID.

4. The method of claim 2, wherein the first group ID management response message indicates admission for allocation of the at least one group ID if a same group ID exists in both the at least one group ID and the at least one allocated group ID and a spatial stream set position for the at least one group ID corresponding to the same group ID matches a spatial stream set position for an allocated group ID corresponding to the same group ID.

5. The method of claim 4, wherein the first group ID management response message includes the information related to the at least one group ID.

6. The method of claim 5, wherein the at least one multi-user packet is transmitted together with one of the at least one group ID.

7. The method of claim 6, further comprising:
transmitting an acknowledgement message for the first group ID management request message before transmission of the first group ID management response message.

8. The method of claim 2, wherein the first group ID management response message indicates adjustment for allocation of the at least one group ID if a same group ID exists in both the at least one group ID and the at least one allocated group ID and a spatial stream set position for the at least one group ID corresponding to the same group ID does not match a spatial stream set position for the at least one allocated group ID corresponding to the same group ID.

9. The method of claim 8, wherein the first group ID management response message includes information related to the at least one allocated group ID.

10. The method of claim 9, further comprising:
receiving a second group ID management request message from the first transmitter, second group ID management request message including information related to at least one adjusted group ID intended for allocation to the receiver,
wherein the at least one adjusted group ID is determined based on the information related to the at least one allocated group ID.

11. The method of claim 10, wherein the at least one multi-user packet is transmitted together with one of the at least one adjusted group ID.

12. The method of claim 11, further comprising:
transmitting an acknowledgement message for the first group ID management request message before transmission of the first group ID management response message.

13. The method of claim 8, wherein the first group ID management response message includes information related to the same group ID.

14. The method of claim 13, further comprising:
receiving a second group ID management request message from the first transmitter, the second group ID management request message including information related to at least one adjusted group ID intended for allocation to the receiver,
wherein the at least one adjusted group ID is determined based on the information related to the same group ID.

15. The method of claim 14, wherein the at least one multi-user packet is transmitted together with one of the at least one adjusted group ID.

16. The method of claim 15, further comprising:
transmitting an acknowledgement message for the first group ID management request message before transmission of the first group ID management response message.

17. A wireless apparatus comprising:
a transceiver configured for transmitting and receiving a radio signal; and
a processor operationally coupled to the transceiver, the processor configured for:
controlling the transceiver to receive a first group identifier (ID) management request message from a transmitter, the first group ID management request message including information related to at least one group ID intended for allocation to a receiver for multi user-multiple input multiple output (MU-MIMO) transmission, and the information indicating each of the at least one group ID and a spatial stream set position for each of the at least one group ID;
controlling the transceiver to transmit a first group ID management response message to the transmitter, the first group ID management response message indicating admission or adjustment for allocation of the at least one group ID; and
controlling the transceiver to receive at least one multi-user packet from the transmitter via at least one spatial stream in a croup ID determined based on the first group ID management response message,
wherein the at least one multi-user packet is transmitted using MU-MIMO transmission.

18. A method of a receiver receiving a multi-user packet in a wireless local area network system, the method comprising:
receiving a group identifier (ID) management request message from a first transmitter, the group ID management request message including information related to at least one group ID intended for allocation to the receiver for multi user-multiple input multiple output (MU-MIMO) transmission, the information indicating each of the at least one group ID and a spatial stream set position for each of the at least one group ID;
transmitting a group ID management announcement message to a second transmitter, the group ID management announcement message indicating admission or adjustment for allocation of the at least one group ID and including the information related to the at least one group ID and the spatial stream set position for each of the at least one group ID; and receiving a multi-user packet from the second transmitter via at least one spatial stream in a group ID determined based on the group ID management announcement message.

* * * * *